United States Patent
Fraisse et al.

(10) Patent No.: US 10,614,191 B1
(45) Date of Patent: Apr. 7, 2020

(54) PERFORMING PLACEMENT AND ROUTING CONCURRENTLY

(71) Applicant: Xilinx, Inc., San Jose, CA (US)

(72) Inventors: Henri Fraisse, Sunnyvale, CA (US); Dinesh D. Gaitonde, Fremont, CA (US)

(73) Assignee: XILINX, INC., San Jose, CA (US)

( * ) Notice: Subject to any disclaimer, the term of this patent is extended or adjusted under 35 U.S.C. 154(b) by 127 days.

(21) Appl. No.: 15/991,791

(22) Filed: May 29, 2018

(51) Int. Cl.
*G06F 17/50* (2006.01)

(52) U.S. Cl.
CPC ........ *G06F 17/5077* (2013.01); *G06F 17/504* (2013.01); *G06F 17/5054* (2013.01); *G06F 17/5068* (2013.01); *G06F 17/5072* (2013.01); *G06F 17/5081* (2013.01); *G06F 2217/08* (2013.01)

(58) Field of Classification Search
None
See application file for complete search history.

(56) References Cited

U.S. PATENT DOCUMENTS

| | | | |
|---|---|---|---|
| 8,522,185 B1 | 8/2013 | Balzli, Jr. | |
| 8,665,727 B1 | 3/2014 | Trimberger | |
| 8,984,462 B1 | 3/2015 | Das et al. | |
| 9,613,173 B1 | 4/2017 | Aggarwal et al. | |
| 9,864,830 B1 | 1/2018 | Jha et al. | |
| 10,452,452 B2 * | 10/2019 | Hetzel | G06F 15/78 |

OTHER PUBLICATIONS

S.U. Hedge, "A Concurrent Placement and Routing Strategy for Improving the Quality of Application Specific Memory Designs," 1996 IEEE, pp. 28-31. (Year: 1996).*
S.-C. Chen et al., "FPGA Placmenet and Routing," 2017 IEEE, pp. 914-921. (Year: 2017).*
Specification and drawings for U.S. Appl. No. 15/984,870, filed May 21, 2018, Gaitonde et al.

* cited by examiner

*Primary Examiner* — Leigh M Garbowski
(74) *Attorney, Agent, or Firm* — Cuenot, Forsythe & Kim, L.L.C.

(57) ABSTRACT

Method and system relate generally to generating a physical design for a circuit design. In such a method, a logical network is obtained from a logical netlist for the circuit design. A physical network for an integrated circuit chip is obtained. The physical network is converted into a routing graph. The logical network and the routing graph are combined to build an extended network. Routing is performed on the extended network for the logical netlist to perform placement and the routing concurrently to provide the physical design.

20 Claims, 6 Drawing Sheets

PERFORMING PLACEMENT AND ROUTING CONCURRENTLY

TECHNICAL FIELD

The following description relates to integrated circuit devices ("ICs"). More particularly, the following description relates to performing placement and routing concurrently for an IC.

BACKGROUND

Conventional place and route flows for integrated circuits include a separate placement step and a separate routing step, which steps are conventionally performed independently of one another. For example, first a placer computes a physical location for all cells of a logical netlist, and then a router connects such cells on a physical network. In such a conventional place and route flow, a placer uses routing estimates for guidance.

SUMMARY

A method relates generally to generating a physical design for a circuit design. In such a method, a logical network is obtained from a logical netlist for the circuit design. A physical network for an integrated circuit chip is obtained. The physical network is converted into a routing graph. The logical network and the routing graph are combined to build an extended network. Routing is performed on the extended network for the logical netlist to perform placement and such routing concurrently to provide the physical design.

A system relates generally to generating a physical design for a circuit design. In such a system, a memory is configured to store program code, and a processor, coupled to the memory, in response to executing the program code is configured to initiate operations for generating a physical design for a circuit design. Such operations include: obtaining a logical network from a logical netlist for the circuit design; obtaining a physical network for an integrated circuit chip; converting the physical network into a routing graph including representing wires of the physical network as physical nodes in the routing graph; combining the logical network and the routing graph to build an extended network; and routing on the extended network for the logical netlist to perform placement and such routing concurrently to provide the physical design.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

In a conventional place and route flow, a placer uses routing estimates for guidance. After a placement operation, a separate routing operation is performed. However, having theses as separate operations has limitations associated with a placer basing placements on routing estimates for guidance. However, a router does not change placement of cells, and so some potential synergies between placement and routing may not be exploited.

In contrast, as described below in additional detail, placement and routing are performed concurrently by combining logical and physical networks. More particularly, a routing graph for a physical network is extended with logical nodes of a logical network. The physical network may be for an integrated circuit, and the logical network may be for a circuit design to be instantiated in such an integrated circuit. This combined or extended network in effect is a place and route network. In other words, routing on such an extended network also inherently performs placement. Because placement and routing are performed concurrently as one operation, effectively placement decisions are based on actual routing decisions, and not routing estimates. This allows synergies between placement and routing to be exploited to improve results.

With the above general understanding borne in mind, various configurations for generating a physical design for a circuit design with routing on an extended network are generally described below.

Figure 1:
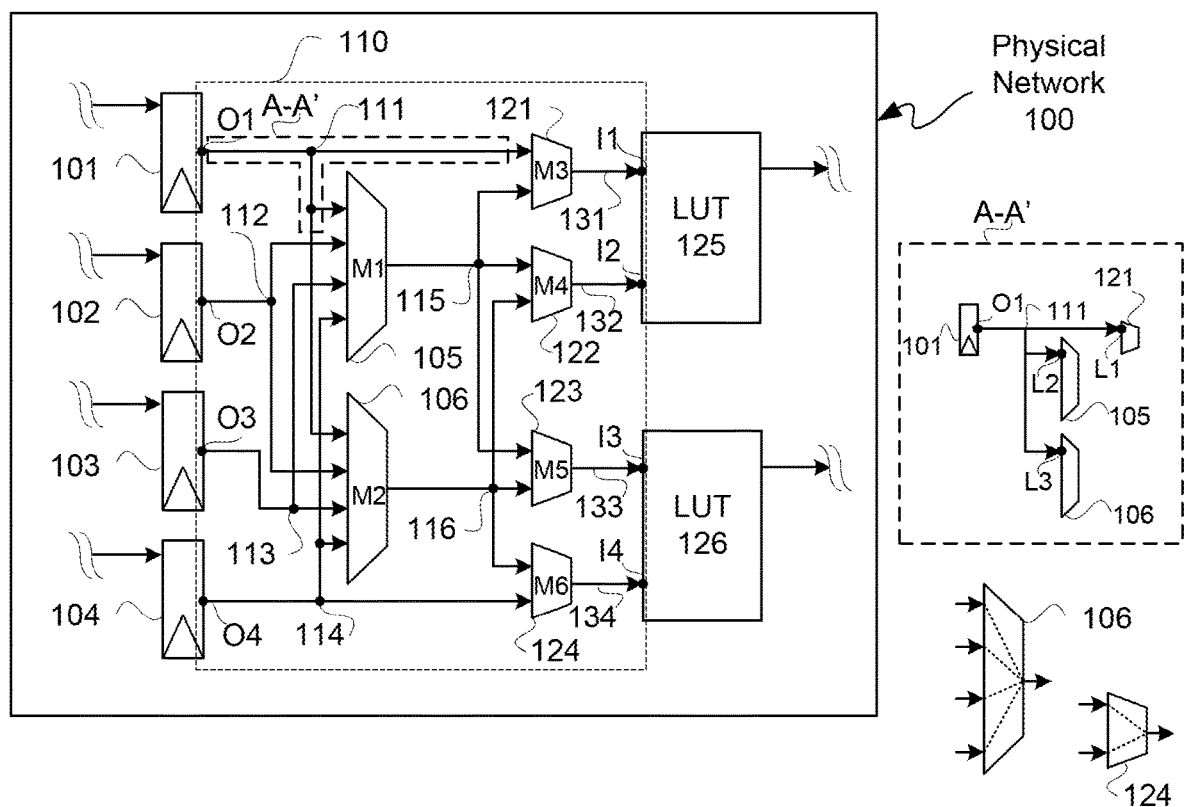
FIG. 1 is a block-circuit diagram depicting an exemplary physical network.

FIG. 1 is a block-circuit diagram depicting an exemplary physical network 100. Physical network 100 may be formed of programmable circuit components of field programmable configurable resources, such as of an FPGA or other programmable logic device. However, the description hereof is not limited to programmable logic devices, but rather may apply to any integrated circuit, combination of integrated circuits interconnected to one another through a circuit board or interposer, or any other configuration of one or more integrated circuits in which a physical network is present for combining with a logical network, as described below in additional detail. For purposes of clarity by way of example and not limitation, it shall be assumed that physical network 100 is a single integrated circuit die ("chip"), such as an FPGA.

Furthermore, even though an example of a physical network 100 is provided for purposes of clarity, this or another physical network formed of same and/or different components and/or signals may be used. Even though single signal lines are used for purposes of clarity, such signal lines may be for single or multiple line signal busses. Additionally, some signals, such as clock and select signals, are not shown for purposes of clarity and not limitation.

Physical network 100, which in this example is a simple FPGA interconnect network, may include multiple subnetworks or "subnets", such as for example subnet 110. Accordingly, subnet or cell 110 may be fixed or programmably interconnected to one or more other subnets or cells of physical network 100, though not shown for purposes of clarity.

In this example, subnet 110 includes registers 101-104, programmable multiplexers 105 and 106 (respectively, generally indicated as M1 and M2), programmable multiplexers 121-124 (respectively, generally indicated as M3 through M6), and lookup table circuits ("LUTs") 125 and 126. However, in another example, these and/or other circuit components may be present in a physical network 100 of a chip. Multiplexers 121-124, 105, and 106 may be programmed to perform routing tasks for instantiation of a circuit design. Along those lines, after programming such programmable multiplexers 121-124, 105, and 106, such multiplexers do not operate as multiplexers but rather operate as respective pass-through circuits. Along those lines, multiplexers 106 and 124 are shown apart from subnet 110 to clearly indicate possible programming paths with dashed lines for example. Multiplexer 106 may be programmed, as is known and thus not shown in unnecessary detail for purposes of clarity, to selected one path of paths represented generally by dashed lines for passing a signal from an input pin to an output pin of multiplexer 106. Likewise, multiplexer 124 may be programmed, as is known and thus not shown in unnecessary detail for purposes of clarity, to selected one path of paths represented generally by dashed lines for passing a signal from an input pin to an output pin of multiplexer 124.

Regardless, physical network 100, or more particularly subnet 110 in this example, may represent circuit components or a subset of circuit components of a chip. Output "pins" O1 through O4 respectively of registers 101-104 are for output signals with respect to subnet 110 and correspond to signal lines ("wires") 111-114. In this example, output pins O1 through O4 are internal output electrically conductive contacts or terminals with respect to a chip in which physical network 100 is located. However, internal or external output contacts or terminals with respect to a chip may be used. By use of the term "pin", it is not meant to imply any particular physical configuration other than a conductive contact or terminal, which may be a conductive bump, a conductive pad, a conductive via, a conductive stump, or other form of conductive contact.

Output pins O1, O2, O3, and O4, may be respective driver or source pins. In other words for example, a signal output from register 101 onto a conductive segment ("wire") 111 may be driven from output pin O1 by register 101, and so output pin O1 may be a driver or source pin of subnet 110 for driving a signal onto wire 111.

In this example, output pin O1 is interconnected to input pins respectively of multiplexers 105, 106, and 121 by wire 111. Output pin O2 is interconnected to respective input pins of multiplexers 105 and 106 by wire 112. Output pin O3 is interconnected to respective input pins of multiplexers 105 and 106 by wire 113. Output pin O4 is interconnected to input pins respectively of multiplexers 105, 106, and 124 by wire 114.

Input pins of multiplexers 105 and 106 may be corresponding load or sink pins. Likewise input pins of multiplexers 121-124 and LUTs 125 and 126 may be corresponding load or sink pins. In other words for example, a signal driven from output pin O1 onto wire 111 by register 101 may be of sufficient strength for handling a load, such as capacitive and resistive loading for example, for providing such signal to an input pin of multiplexer 121, and multiplexer 121 itself may present input capacitance and resistance as part of such load.

Accordingly, such subnet 110 internal input pins, such as input pins to multiplexers 105 and 106, as well as input pins to multiplexers 121-124, may be load or sink pins; however, such internal input pins, such as of multiplexers M1 through M6 for example, are not input pins with respect to a circuit boundary of subnet 110.

To clarify what a "wire" is, a portion A-A' and associated circuits of subnet 110 is shown in apart from subnet 110 in FIG. 1. In this example, wire 111, which may be a single or multiple signal lines, interconnects an output pin O1 of register 101 with input pins L1-L3 respectively of multiplexers 121, 105, and 106 (M3, M1, and M2). Input pins L1-L3 are respective load or sink pins of M3, M1, and M2. More generally, a "wire" is a set of pins electrically interconnected to one another in an IC through one or more metal segments. In this example, wire 111 ("W1") includes or is associated with four pins, namely O1 and L1-L3. Generally, a wire is associated with only one associated driver pin and one or more load pins. However, a wire may be associated with more than one driver pin, but only one of such driver pins is active at a time for driving a signal to one or more load pins.

In this example, an output pin of multiplexer 105 is interconnected by wire 115 to respective input pins of multiplexers 121, 122, and 123. Moreover, in this example, an output pin of multiplexer 106 is interconnected by wire 116 to respective input pins of multiplexers 122, 123, and 124. As previously described, an output pin O1 is interconnected to another input pin of multiplexer 121 by wire 111. Likewise, an output pin O4 is interconnected to another input pin of multiplexer 124 by wire 114.

Output pins of multiplexers 121 and 122 are respectively interconnected to input pins I1 and I2 of LUT 125 by wires 131 and 132, respectively. Output pins of multiplexers 123 and 124 are respectively interconnected to input pins of LUT 126 by wires 133 and 134, respectively.

Input pins I1-I4 of LUTs 125 and 126 are input pins with respect to subnet 110, and, in this example, input pins I1-I4 are internal input pins with respect to a chip in which physical network 100 is located. However, internal or external input pins with respect to a chip may be used.

Input pins I1, I2, I3, I4 may be respective load or sink pins. In other words for example, a signal input to a LUT 125 may be driven by a multiplexer 121 to overcome capacitive and resistive loading effects of LUT 125 and an associated signal input, and so input pin I1 may be a load or sink pin of subnet 110 interconnected to an output pin of multiplexer 121 by wire 131.

Figure 2:
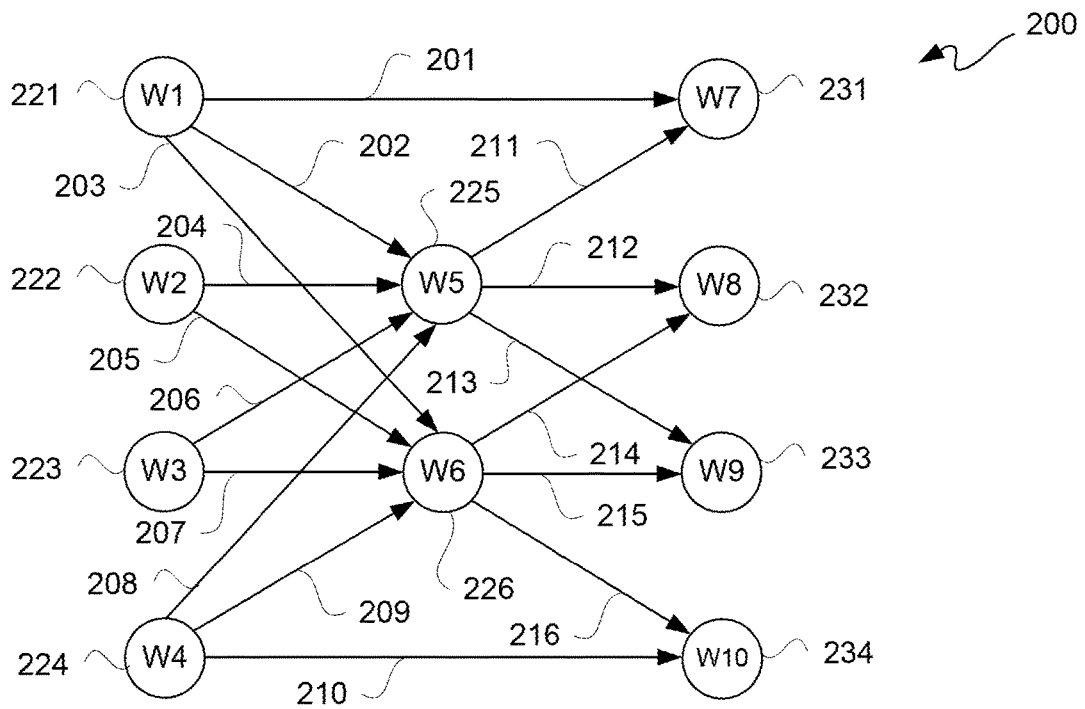
FIG. 2 is a network diagram depicting an exemplary directed routing graph fora subnet of FIG. 1.

FIG. 2 is a network diagram depicting an exemplary directed routing graph 200 for subnet 110 of FIG. 1. Wires 111-114, namely respectively W1, W2, W3, and W4, correspond to output vertices or nodes 221-224 in directed routing graph 200 and are represented as respective circles on the left. Wires 131-134, namely respectively W7, W8, W9, and W10, correspond to input vertices or nodes 231-234 in directed routing graph 200 and are represented as respective circles on the right. Multiplexers 105 and 106 in a programmed state act as pass-through circuits, and thus wires 115 and 116, namely respectively W5 and W6, correspond to intermediate vertices or nodes 225 and 226 in directed routing graph 200, are represented as respective circles in the middle.

Accordingly, nodes or vertices in directed routing graph 200 represent or model wires of a physical network. Lines or edges 201-216 interconnecting such nodes represent or model possible corresponding interconnections or signal paths between two wires through programmable multiplexers in subnet 110.

A directed routing graph G is said to equal ($V_P$, $E_P$), where $V_P$ is a set of vertices V for a physical network P, and where $E_P$ is a set of edges for such a physical network P. So for example, from wire 111 to wire 131, edge 201 represents a signal path of wire 111 from output pin 111 of register 101 to through multiplexer 121 to wire 131, and effectively to an input pin I1 of LUT 125.

Dual input switches, such as multiplexers 121-124, in some instances may be incorporated into edges and vertices of a directed routing graph. So for example, there are two signal paths to input vertex 231, namely edges 201 and 211, and so in effect multiplexer 121 is represented as in edges 201 and 211 going to vertex 231, as there is only one possible signal path, namely wire 131, between output of multiplexer 121 and input pin I1.

Accordingly, it should be appreciated that nodes 221-224, which correspond to actual wires, may be considered physical "output" or driver nodes of directed routing graph 200, and nodes 231-234, which correspond to actual wires, may be considered physical "input" or load nodes of directed routing graph 200. From node 221, edges 201-203 respectively go to nodes 231, 225, and 226 corresponding to possible active routing paths to or through programmable multiplexers, as previously described. From node 222, edges 204 and 205 respectively go to nodes 225 and 226 corresponding to possible active routing paths to or through programmable multiplexers, as previously described. From node 223, edges 206 and 207 respectively go to nodes 225 and 226 corresponding to possible active routing paths to or through programmable multiplexers, as previously described. From node 224, edges 208-210 respectively go to nodes 225, 226, and 234 corresponding to possible active routing paths to or through programmable multiplexers, as previously described. From node 225, edges 211-213 respectively go to nodes 231-233 corresponding to possible active routing paths to or through programmable multiplexers, as previously described. From node 226, edges 214-216 respectively go to nodes 232-234 corresponding to possible active routing paths to or through programmable multiplexers, as previously described.

Figure 3:
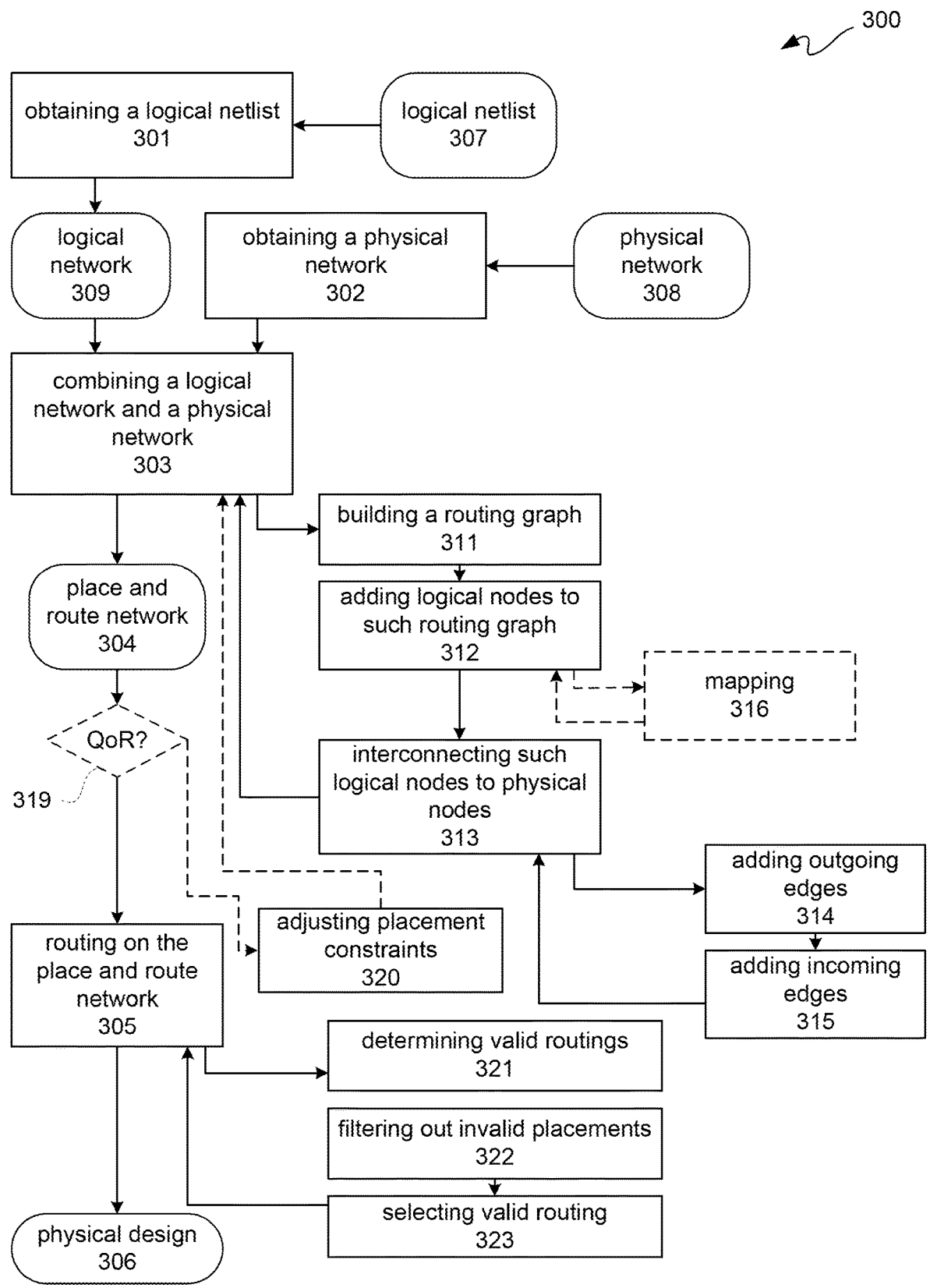
FIG. 3 is a flow diagram depicting an exemplary physical design flow.

With the above-description borne in mind, FIG. 3 is a flow diagram depicting an exemplary physical design flow 300. Physical design flow 300 is for generating a physical design for a circuit design.

Along those lines, at operation 301, a logical netlist 307 for a circuit design may be obtained. A logical netlist is generally a list of circuit components and a list of nodes such circuit components are connected to for a circuit design. Stated another way, a network is two or more interconnected circuit components of a circuit design, and a logical netlist is a list representing such network.

A logical netlist is to be contrasted with other types of netlists, such as for example a physical netlist. However, a logical netlist can be flat or hierarchical, the latter of which can be folded or unfolded.

From such logical netlist 307 obtained at 301, a logical network 309 may be generated at 301 for such logical netlist. At operation 302, a physical network 308 may be obtained for instantiation of such logical netlist 307 obtained at 301. A physical network 308 in this example is for an FPGA; however, a physical network of another chip may be obtained in another example. Generally, a physical network represents interconnected circuit components, where such interconnections may be programmable or fixed. For example, an FPGA may be selected for instantiation of a circuit design, and such FPGA has a physical network. Physical network 100, and more particularly subnet 110, is an example of a physical network 308, and again a physical network 100 may be represented as a directed routing graph 200.

At operation 303, a logical network 309 and a physical network 308 may be combined to build a merged network, namely a "place and route" network 304. A logical network 309 is represented by a logical netlist 307 obtained at 301, and so a logical network 309 may be obtained from such a logical netlist 307. A physical network 308 obtained at 302 may be combined with a logical network 309 obtained at 301 to provide a single corresponding "place and route network" 304. In brief, a physical network represents hardware, and a logical network represents a logical netlist to be placed and routed on such hardware. Again, for purposes of clarity by way of non-limiting example, examples of logical and physical networks are described, though these and/or other examples of logical and physical networks may be used.

To combine a logical network 309 and a physical network 308, as part of operation 303, a routing graph may be constructed at operation 311. Operation 311 may be a separate converting operation of physical network into a routing graph, including representing wires of such physical network as physical nodes in such routing graph, and such converting operation may be performed prior to combining operation 303. However, for purposes of clarity by way of example and not limitation, a converting operation 311 is depicted as being part of a combining operation 303. Such a routing graph may be for physical network having physical nodes and associated signal paths, such as for example as described for directed routing graph 200. Physical nodes in such routing graph are modeling the wires of a physical network, as previously described.

Further at operation 303, logical nodes of a logical network 309, such as for a logical netlist 307 obtained at 301, may be added at operation 312 to such a routing graph constructed at 311. Logical nodes or vertices may be added at operation 312 and subsequently interconnected to physical input nodes and output nodes at operation 313 of operation 303. For example, one or more of physical output nodes 221-224 and one or more of physical input nodes 231-234 may be interconnected to added logical nodes. By adding and interconnecting such logical nodes to physical nodes, an extended network may be built, namely a "place and route network."

Interconnecting operation 313 may include edge adding operations 314 and 315. Edge adding operation 314 may be for a source node of such logical nodes corresponding to an output node in such circuit design. For such a source node, an outgoing edge may be added from such source node to at least one driver node of physical output nodes. This operation 314 may be repeated for each source node of such logical nodes.

Edge adding operation 315 may be for a sink node of such logical nodes corresponding to an input node in such circuit design. For such a sink node, an incoming edge may be added from such sink node to at least one load node of such physical input nodes. This operation 315 may be repeated for each sink node of such logical nodes.

Each physical output node associated with a source node may have an outgoing edge added, and each physical input node associated with a sink node may have an incoming edge added. This may result in a one to more than one mapping, namely one logical node may be interconnected to more than one source node. This interconnecting may be used to cover all possible combinations.

Thus, interconnecting operation 313 may include: interconnecting a first set of all combinations of interconnections of input nodes of logical nodes to input nodes of physical nodes; and interconnecting a second set of all combinations of interconnections of output nodes of logical nodes to output nodes of physical nodes. However, not all possible interconnects need be considered in some applications. So, in such applications, interconnecting operation 313 may include: interconnecting a first subset of combinations of interconnections of input nodes of logical nodes to input nodes of physical nodes; and interconnecting a second subset of combinations of interconnections of output nodes of logical nodes to output nodes of physical nodes.

While considering all possible combinations may result in obtaining an optimal solution space, this may be excessively computationally intensive for larger problem spaces. Along those lines, a heuristic may be added to limit possible interconnections, such as according to proximity for example. Adding one or more constraints may reduce computational intensiveness for determining a solution space, and further may avoid consideration of invalid solutions further reducing computational time.

Accordingly, not all possible locations on a physical network need to be considered, and rather subsets of possible locations on a physical network may be used. At optional mapping operation 316, a mapper, such as one that may be used for conventional partitioning and/or floorplanning, may be used as a guide to preselect a subset of resources of a physical network, namely a subset of physical nodes, to be considered for adding logical nodes thereto. This mapping may be used to guide building of an extended network to reduce problem size.

Mapping operation 316 may be for modeling incremental placement. For example, there may be situations where the number of possible placements is restricted for all or some circuit instances of a place and route problem. An example of this may be for a predetermined placement or pre-placement for some or all cells of a circuit design. Another example of this may be to simply limit placement choices to improve runtime. In these or other examples, mapping operation 316 may be implemented by controlling connections between logical and physical nodes in a build of place and route network 304.

At operation 305, a circuit design may be routed on place and route network 304 responsive to such logical netlist obtained at 301 to perform placement and routing concurrently as one integral operation. However, there may be more than one valid routing generated at operation 305 in a solution space, and a valid routing from such solution space may be selected according to a weighting or other known criteria. However, not all valid routings on a place and route network 304 are necessarily also valid placements.

At operation 305, valid routings may be determined at operation 321 to have a solution space including multiple valid routings. Determination of valid routings may include culling at operation 305 subsets of outgoing edges and incoming edges added for interconnecting as previously described. To filter out invalid placements from corresponding valid routings generated at operation 321, a filtering out operation 322 of operation 305 may be performed to reduce a solution space by removing invalid placements of valid routings. To filter out invalid placements at operation 322, two constraints may be added for such operation.

A first constraint may be each circuit instance of a logical net or subnet must be mapped to a unique circuit instance in a physical network. This constraint may be encoded in a router as: two or more logical input nodes of a logical network can be mapped to a same physical sink circuit instance if and only if such two logical input nodes belong to a same logical sink circuit instance; and two or more logical output nodes of a logical network can be mapped to a same physical source circuit instance if and only if such two logical output nodes belong to a same logical source circuit instance. Use of these criteria is described below in additional detail.

A second constraint may be that each logical input/output node must have a unique or sole placement. In other words, every logical input and output node must be connected to only one physical input and output node, respectively, in a possible routing solution. This constraint may be removed for circuit instance replication.

After invalid placements of valid routings are removed, a best valid routing may be selected at operation 323 of operation 305 from a solution space of valid routings remaining. A physical design 306 may be output as a result of operation 305. Conventionally, a physical design may be generated by a sequence of partitioning, floorplanning, placing, clock tree synthesizing, signal routing, and closing timings (timing closures) operations. Accordingly, for purposes of clarity and not limitation, not all possible operations for generating a physical design are described herein in unnecessary detail. Conventionally placement is a separate operation from a subsequent routing operation; however, as described herein no separate placement operation is performed in providing a physical design 306.

A logical network and a physical network are combined to provide a place and route network, where routing a circuit design on such place and route network likewise performs placement, as such routing is performed with placement constraints built into such place and route network. In other words, a physical network and a logical network are combined such that "legal" or valid routes on a resulting place and route network encodes both a placement and a routing for such placement. Additional constraints than those strictly used for routing may be added to filter out invalid routing options.

By in effect performing placement and routing simultaneously for a logical netlist using a place and route network 304, synergies between placement and routing may be obtained. These synergies may be beneficial in improving a Quality of Result ("QoR"), such as less delays, and/or may reduce congestion. Effectively, a place and route problem is modeled as an augmented routing problem with additional constraints. This allows placement to be inherently performed with actual, not estimated, routing decisions.

Moreover, a router may effect changes to a placement. Along those lines, after a place and route network 304 is generated, such place and route network 304 may optionally be checked for a QoR at operation 319. If such a place and route network 304 does not meet or exceed a QoR threshold as determined at operation 319, placement constraints may optionally be adjusted at operation 320. Adjusting at operation 320 may be for having a revised mapping at operation 316 for example.

Along those lines, a place and route problem may be solved multiple times with different placement choices until a target QoR is met or exceeded. In other words, place and route networks 304 may be iteratively generated and routed to provide multiple place and route networks 304 for a same place and route problem with various placement choices until a QoR goal is at least achieved.

As described below in additional detail by way of example for purposes of clarity and not limitation, routing is performed on an extended network, namely place and route network 304, which represents both a logical netlist and a physical network.

Figure 4:
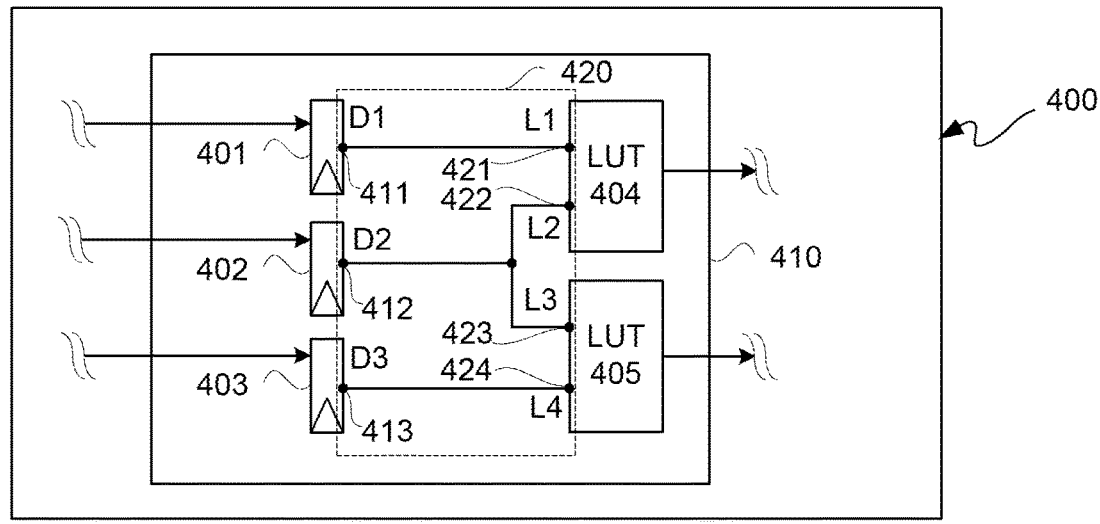
FIG. 4 is a block-circuit diagram depicting an exemplary circuit design module of a circuit design.

For purposes of clarity by way of non-limiting example, FIG. 4 is a block-circuit diagram depicting an exemplary circuit design module 410 of a circuit design 400. Circuit design module 410 is to be implemented within a physical network, such as subnet 110 for purposes of clarity by way of non-limiting example. Circuit design module 410 may be a module in a larger circuit design 400. Circuit design module 410 is a representation of a logical network of a logical netlist.

Though circuit design module 410 is a rudimentary example for purposes of clarity, extension of circuit design module 410 follows from the description herein. Along those lines, circuit design module 410 may more generally represent a logical network, such as a subsystem or subnet, of an integrated circuit design 400. Such a subsystem or subnet may respectively be for a math engine or a network-on-a-chip. Multiple modular logical networks of a circuit design 400 may be processed as described herein, and such modular logical networks may be subsequently interconnected to one another to form an overall logical network for an integrated circuit design 400. A resulting physical design 306 may thus have both a detailed placement and a detailed routing incorporated in each of such logical network modules, which may be followed by a global routing for an overall logical network.

Optionally, routing 305 on a place and route network 304 as described herein may be used to close timing on the challenging portions of an FPGA design, such as "soft" circuits, such as circuits that may be instantiated in programmable resources with use of a configuration bitstream. Optionally, routing 305 on a place and route network 304 as described herein may be used to improve the quality of result ("QoR") of FPGA designs though the replacement and routing of some speed of operation limiting or "critical" portions after placement and routing of the conventional flow. Accordingly, while description herein is for a non-limiting example of an initial routing for purposes of clarity, other types of routings 305 on a place and route network 304 may benefit from technologies described herein.

Circuit design module 410 includes representations of registers 401-403 and LUTs 404 and 405. Output nodes 411-413 respectively of registers 401-403 are generally indicated as D1-D3, respectively. Output nodes D1-D3 may be respective output or source nodes of logical nodes of a logical network or logical subnet 420 of circuit design module 410. Clock and other signal paths which may be used in circuit design module 410 are not shown for purposes of clarity and not limitation.

Input pins 421 and 422 of LUT 404 are generally indicated as L1 and L2, respectively. Input pins 423 and 424 of LUT 405 are generally indicated as L3 and L4, respectively. Input pins L1-L4 may be respective input or sink nodes of logical nodes of a subnet 420 of circuit design module 410. In this example, output pin 411 is directly interconnected to input pin 421; output pin 412 is directly interconnected to input pins 422 and 423; and output pin 413 is directly interconnected to input pin 424.

Figure 5:
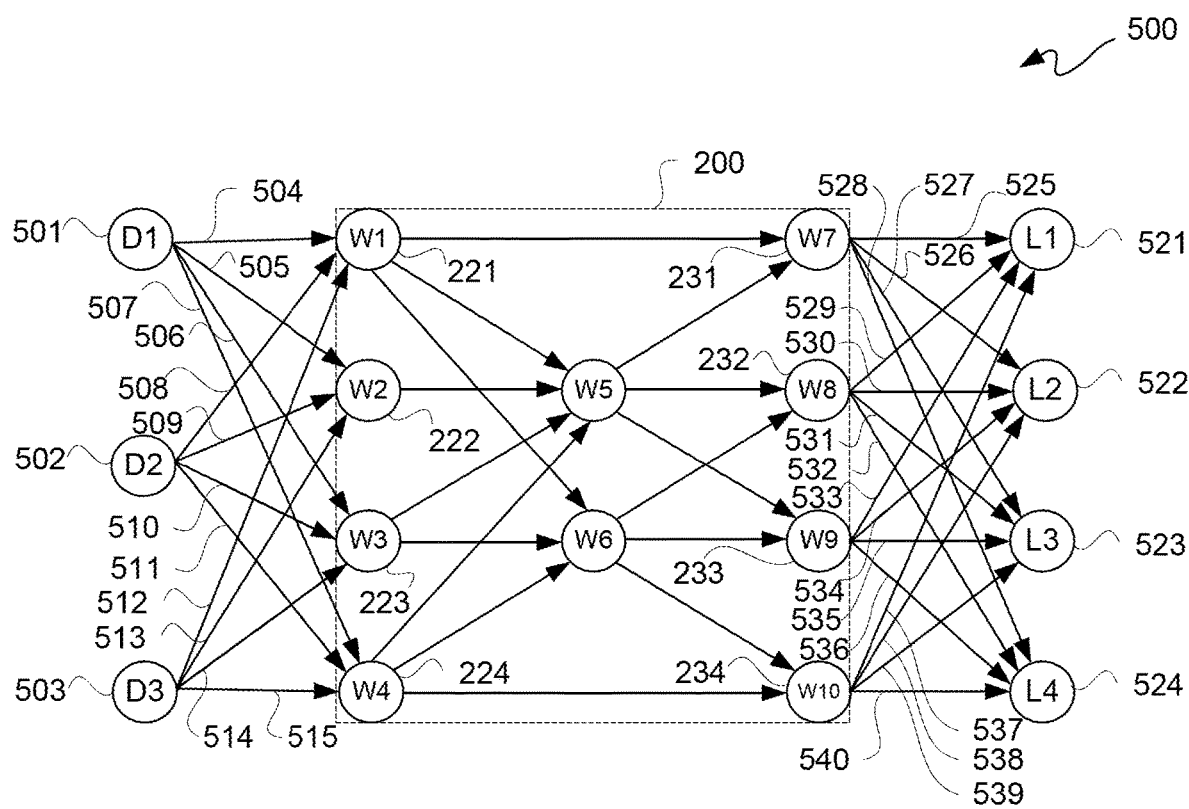
FIG. 5 is a network diagram depicting an exemplary directed routing graph for an extended network.

FIG. 5 is a network diagram depicting an exemplary directed routing graph 500 for an extended network. Such an extended network may be an example of a place and route network 304. Directed routing graph 500 includes directed routing graph 200, such as for subnet 110.

Source nodes 501-503, which correspond to output pins of logical subnet 420 for a logical netlist, are interconnected to output or driver nodes 221-224 of a routing graph 200 for subnet 110 of a physical network 100. Output pins 411-413 respectively of registers 401-403 correspond to source nodes 501-503, generally respectively indicated as vertices D1-D3.

In addition to adding source nodes 501-503 to construct routing graph 500, outgoing edges from such source nodes are provided to driver nodes 221-224. For this example, all possible interconnects from source nodes to driver nodes of a logical subnet are used for determining a solution space. However, in another example, a subset of such possible interconnects may be examined for determining a solution space.

In this example, each of outgoing edges 504-507 originate from source node 501 and are respectively interconnected to driver nodes 221-224. However, outgoing edges 504-507 represent just possible interconnects from a same source of a signal path in subnet 420, namely from output pin 411.

Furthermore, in this example, each of outgoing edges 508-511 originate from source node 502 and are respectively interconnected to driver nodes 221-224. However, outgoing edges 508-511 represent just possible interconnects from a same source of a signal path in subnet 420, namely from output pin 412.

Likewise, in this example, each of outgoing edges 512-515 originate from source node 503 and are respectively interconnected to driver nodes 221-224. However, outgoing edges 512-515 represent just possible interconnects from a same source of a signal path in subnet 420, namely from output pin 413.

Sink nodes 521-524, which correspond to input nodes of logical subnet 420 for a logical netlist, are interconnected to input or load nodes 231-234 of a physical routing graph 200 for physical subnet 110 of a physical network 100. Input pins 421-424 correspond to sink nodes 521-524, generally respectively indicated as vertices L1-L4.

In addition to adding sink nodes 521-524 to construct routing graph 500, incoming edges from load nodes 231-234 are provided to sink nodes 521-524. For this example, all possible interconnects from load nodes to sink nodes are used for determining a solution space. However, in another example, a subset of such possible interconnects may be examined for determining a solution space.

In this example, each of incoming edges 525-528 respectively originating from load node 231 respectively go to sink nodes 521-524. However, incoming edges 525-528 represent just possible interconnects to a same sink of a signal path in subnet 420, namely to input pin 421.

In this example, each of incoming edges 529-532 respectively originating from load node 232 respectively go to sink nodes 521-524. However, incoming edges 529-532 represent just possible interconnects to a same sink of a signal path in subnet 420, namely to input pin 422.

Furthermore, in this example, each of incoming edges 533-536 respectively originating from load node 233 respectively go to sink nodes 521-524. However, incoming edges 533-536 represent just possible interconnects to a same sink of a signal path in subnet 420, namely to input pin 423.

Likewise, in this example, each of incoming edges 537-540 respectively originating from node 234 respectively go to sink nodes 521-524. However, incoming edges 537-540 represent just possible interconnects to a same sink of a signal path in subnet 420, namely to output node 424.

This is not just a logical-to-physical interconnection of nodes, but such nodes represent corresponding circuits. For example, output/source logical nodes 501-503 are for outputs of corresponding registers, and likewise output/source physical nodes 221-224 are for outputs of corresponding registers. Thus, an association such as by interconnection of output/source logical nodes 501-503 to output/source physical nodes 221-224 for wires 111-114, respectively, is both a routing and a selection or placement of corresponding circuits.

Likewise, for example, input/sink logical nodes 521-524 are for inputs of LUTs, and likewise input/sink physical nodes 231-234 are for wires 131-134, respectively, providing corresponding inputs to LUTs. Thus, an association such as by interconnection of input/sink logical nodes 521-524 to input/sink physical nodes 231-234 is both a routing and a selection or placement of corresponding circuits.

To recapitulate, logical output nodes are interconnected to physical output nodes of a subnet to provide a number of possible signal pathways on an output side as well as effecting a possible placement, and logical input nodes are interconnected to physical input nodes of such subnet to provide a number of possible signal pathways on an input side as well as effecting a possible placement. In this configuration, for a left-to-right data flow, logical output nodes on a source or left side bracket a source side of physical output nodes for corresponding logical and physical circuits, and logical input nodes on a sink or right side bracket a sink side of physical input nodes for corresponding logical and physical circuits.

Mathematically, this means for a logical netlist N and a physical network P modeled by a directed routing graph $G=(V_P, E_P)$, directed routing graph G is extended to model a place and route network as an extended directed routing graph H, where $H=(V, E)$ for a union of vertices and edges, namely $V=V_P \cup V_L$ and $E=E_P \cup E_L$. Again, $V_P$ is a set of vertices V for a physical network P, and $E_P$ is a set of edges for such a physical network P. Likewise, $V_L$ is a set of vertices V corresponding to input/output nodes of a logical network L. However, $E_L$ is a set of edges connecting logical nodes of a logical network L and physical nodes of a physical network P.

After sets of possible interconnections are generated for interconnection of logical and physical nodes as previously described, such sets of possible interconnections may be evaluated for valid solution spaces, from which a best solution may be converged to or selected.

Figure 6:
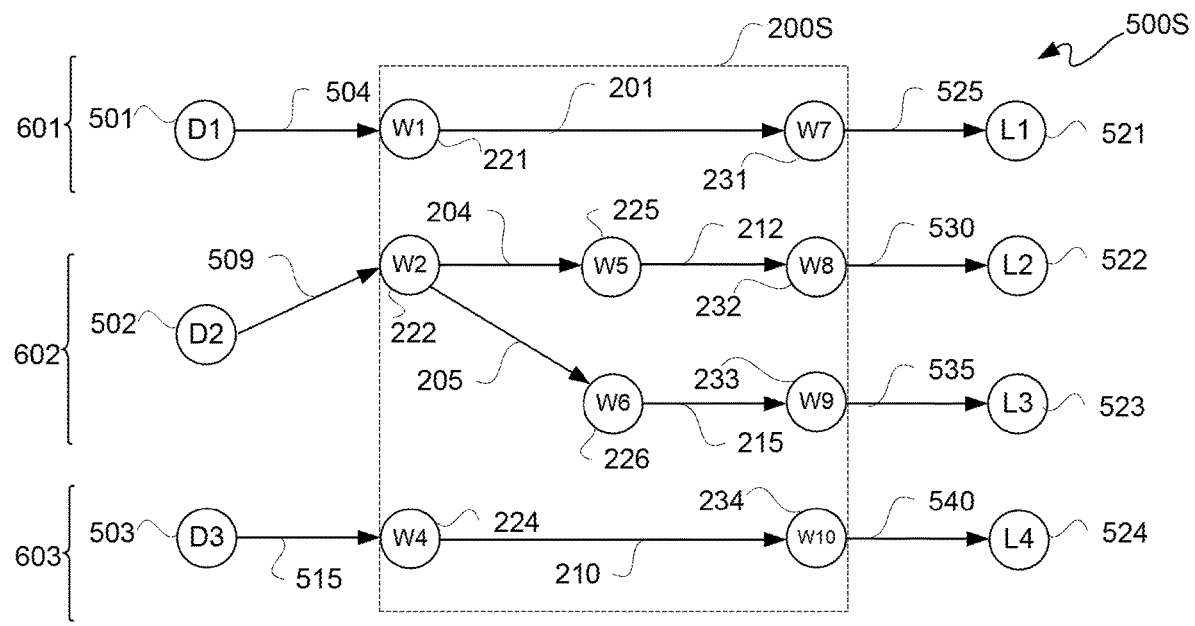
FIG. 6 is a network diagram depicting an exemplary valid routing graph solution for a directed routing graph of FIG. 5 for instantiation of a logical subnet in a physical network of FIG. 1 using a physical subnet directed routing graph of FIG. 2.

FIG. 6 is a network diagram depicting an exemplary valid directed routing graph solution 500S for directed routing graph 500 for instantiation of logical subnet 420 in a physical network 100 using physical subnet directed routing graph 200S. However, not all possible connects within physical subnet routing graph 200S are used for this valid routing solution, as only a subset of such connections are needed to implement logical subnet 420. Likewise, not all possible interconnections between logical and physical nodes in routing graph 500 are needed to implement this valid routing solution.

For example, logical output nodes 501-503 are respectively interconnected to a subset of physical output nodes 221-224. More particularly, logical output nodes 501-503 are respectively interconnected to physical output nodes 221, 222, and 224 with corresponding outgoing edges or interconnect lines 504, 509, and 515. Such outgoing edges used in valid routing graph solution 500S are a subset of such outgoing edges. Likewise, in this example, physical input nodes 231-234 are respectively interconnected to logical output nodes 521-524 with only associated incoming edges or interconnect lines 525, 530, 535, and 540, namely a subset of incoming edges.

With reference to internal connections of physical subnet represented by routing graph 200, only a subset of such internal connections are used to provide a valid physical subnet routing graph solution 200S using routing graph 200. Along those lines, only interconnects 201, 204, 205, 210, 212, and 215 of possible interconnects 201-226 are used for valid subnet routing graph solution 200S. Again, multiplexers of physical subnet 110 are programmable for multiplexing and/or routing, and in this example, such multiplexers are used for routing only.

For a routing solution from a logical output node 501 connected through one or more physical nodes to a logical input node 521 in an extended directed routing graph 500S, there may be a tree net ("tree") 601. Likewise, a routing solution from a logical output node 502 connected through one or more physical nodes to logical input nodes 522 and 523 in an extended directed routing graph 500S, there may be a tree 602. Furthermore, for a routing solution from a logical output node 503 connected through one or more physical nodes to a logical input node 524 in an extended directed routing graph 500S, there may be a tree 603. Trees 601-603 may be disjointed from one another with respect to signal pathways not interconnecting such trees to one another. While ancillary signals, such as clock signals and/or supply and ground voltage signals for power and/or programming, in reality may interconnect such trees to one another, signal pathways, namely such as for data signals, are disjointed from one another in an extended directed routing graph solution 500S.

Generally, in a valid routing graph solution, sources and sinks of a place and route problem to instantiate a circuit design using a physical network are given by logical nets or subnets of a logical network for such circuit design. For a general example, for each of such nets or subnets of a logical network with a driver or output node, D, and load nodes L1-Ln, for n a positive integer greater than one, input nodes L, a logical node for a driver node D is considered a source node, and sink nodes associated with such driver node D are considered as logical nodes of load nodes L1-Ln. For this general example, a valid routing solution for a place and route network, such as represented by an extended directed routing graph H, may include a disjointed tree extracted from extended directed routing graph H that connects such source driver node D to such associate sink nodes, namely load nodes L1-Ln.

More generally, for each valid routing solution for instantiating a circuit design on a place and route network configured with a logical network for such circuit design as represented by an extended directed routing graph H, there may be disjointed trees for each driver node Dn connected through one or more physical nodes to one or more associated load nodes Ln. While valid routing graph solution 500S is one example of a valid routing solution, there may other valid routing solutions for this example. More generally, there may be one or more valid routing solutions for a solution space for instantiating a circuit design on a place and route network configured with a logical network for such circuit design as represented by an extended directed routing graph H.

Furthermore, such valid routing solution of an example valid routing graph solution 500S in this example is likewise a valid placement. In this example on a source side, though shown as being interconnected in a routing graph, for a physical realization logical output node D1 is placed on physical output node W1; logical output node D2 is placed on physical output node W2; and logical output node D3 is placed on physical output node W4. Likewise, in this example on a sink side, though shown as being interconnected in a routing graph, for a physical realization logical input nodes L1-L4 are respectively placed on physical input nodes W7-W10.

There may be multiple possible valid routing solutions for instantiating a circuit design on a place and route network configured with a logical network for such circuit design as represented by an extended directed routing graph H. Each of these possible valid routing solutions may be weighed for selection of a best valid routing solution from a space of valid routing solutions. However, not all possible valid routing solutions specify valid placements, in contrast to the previous example, for instantiating a circuit design on a place and route network configured with a logical network for such circuit design as represented by an extended directed routing graph H.

Figure 7:
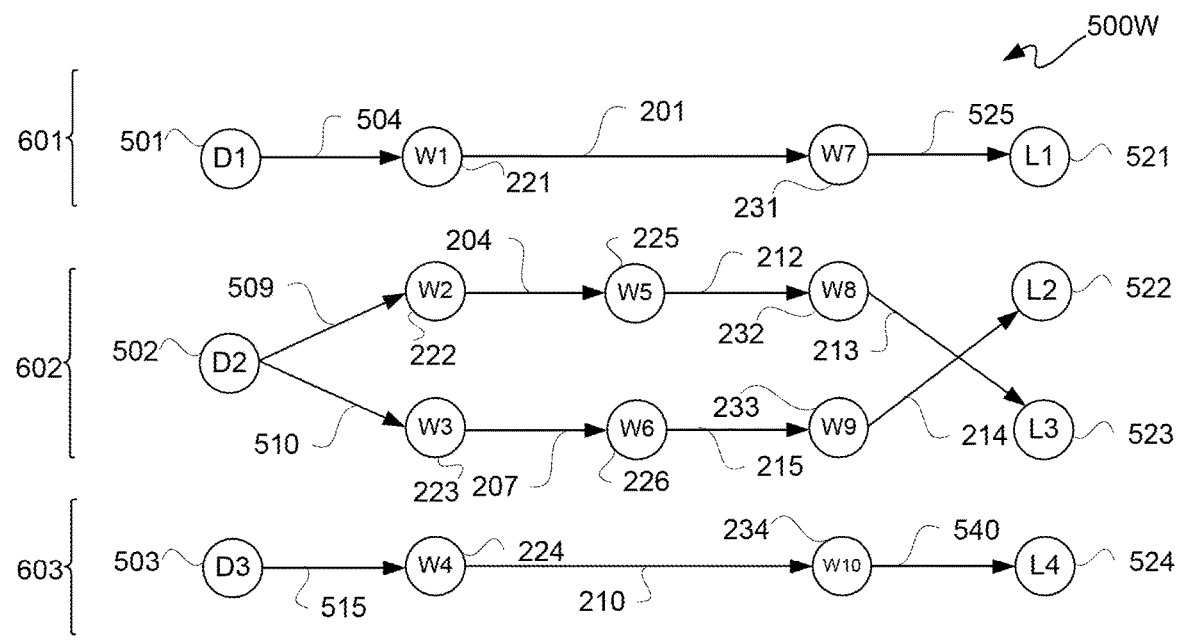
FIG. 7 is a network diagram depicting another exemplary valid routing graph solution for a directed routing graph of FIG. 5 for instantiation of a logical subnet in a physical network of FIG. 1 using a physical subnet routing graph of FIG. 2.

FIG. 7 is a network diagram depicting another exemplary valid directed routing graph solution 500W for directed routing graph 500 for instantiation of logical subnet 420 in a physical network 100 using routing graph 200. Valid directed routing graph solutions 500S and 500W differ only with respect to tree 602, and so just trees 602 are described for purposes of clarity and not limitation.

For tree 602 of routing graph 500S, logical output node 502 for an output node 412 of register 402 is interconnected via edge 509 to physical output node 222, corresponding to wire 112 for output of a register 102 for a proper placement. Physical output node 222 is interconnected by edges 204 and 205 respectively to wire nodes 225 and 226, respectively representing a forked line from wire 112 to respective inputs of multiplexer 105 and multiplexer 106 for respective outputs therefrom. Edges 212 and 215 respectively from wire nodes 225 and 226 are interconnected to input nodes 232 and 233, respectively, which represents that multiplexers 105, 106, 122, 123 are each configured to pass input from wire 112 to respective outputs thereof, and input nodes 232 and 233 are respectively connected to input nodes 522 and 523 through edges 530 and 535, respectively. In this example, output of multiplexer 122 is connected to wire 132 for input to LUT 125, namely, input pin I2, and output of multiplexer 123 is connected to wire 133 for input to LUT 126, namely input pin I3, and input pins I2 and I3 correspond to input nodes 422 and 423 respectively of LUTs 404 and 405 for a proper placement.

However, for tree 602 of routing graph 500W, edge 205 is omitted, and edges 510 and 207, as well as output node 223, are added. In this example, edge 510 from output node 502 to output node 223 is used, and an edge 207 from output node 223 to wire node 226 is used. In this routing, both of registers 102 and 103 are used as wires 112 and 113 correspond to output nodes 222 and 223. Thus, rather than one register for placement of register 402 as in FIG. 5, there are two registers for placement of register 402 having an output pin 412 corresponding to output node 502.

A remainder of tree 602 of routing graph 500W is the same as in routing graph 500S, except for interconnection of input nodes to one another. In tree 602 of routing graph 500W, input node 232 is connected with edge 213 to input node 523, and input node 233 is connected with edge 214 to input node 522. While tree 602 may be a valid routing, this cross-connection of nodes is an invalid placement. Output pin 412 of register 402 is to be interconnected to input nodes 422 and 423 respectively of LUTs 404 and 405; however, in this tree 602, output of register 102 goes to input pin I3 of LUT 126, and output of register 103 goes to input pin I2 of LUT 125. In other words, in logical subnet 420, outputs respectively from output pins 411 and 412 are to be provided to separate input pins 421 and 422 to a same logical LUT 404, and likewise outputs respectively from output pins 412 and 413 are to be provided to separate input pins 423 and 424 to a same logical LUT 405. However, for tree 602 of routing graph 500W, L1 and L2 are not placed on respective input pins of a same logical LUT 404, and likewise L3 and L4 are not placed on respective input pins of a same logical LUT 405.

Accordingly, while routing graph 500W is a valid routing, routing graph 500W is not a valid placement. In other words, by considering input and output nodes, circuit instances associated with such input and output nodes may not be fully considered leading to an invalid placement. To filter out invalid placements from valid routings, additional constraints may be added.

To capture circuit instances for logical input and output nodes, a constraint may be added to ensure logical input nodes and output nodes of a same logical circuit instance are always placed on a same physical circuit instance. Conversely, another constraint may be added to ensure logical input nodes and output nodes of different logical circuit instances are always placed on different physical circuit instances. Another constraint which may be added is that each logical input/output node may have one and only one physical placement, unless instance replication is allowed to be modeled.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 8:
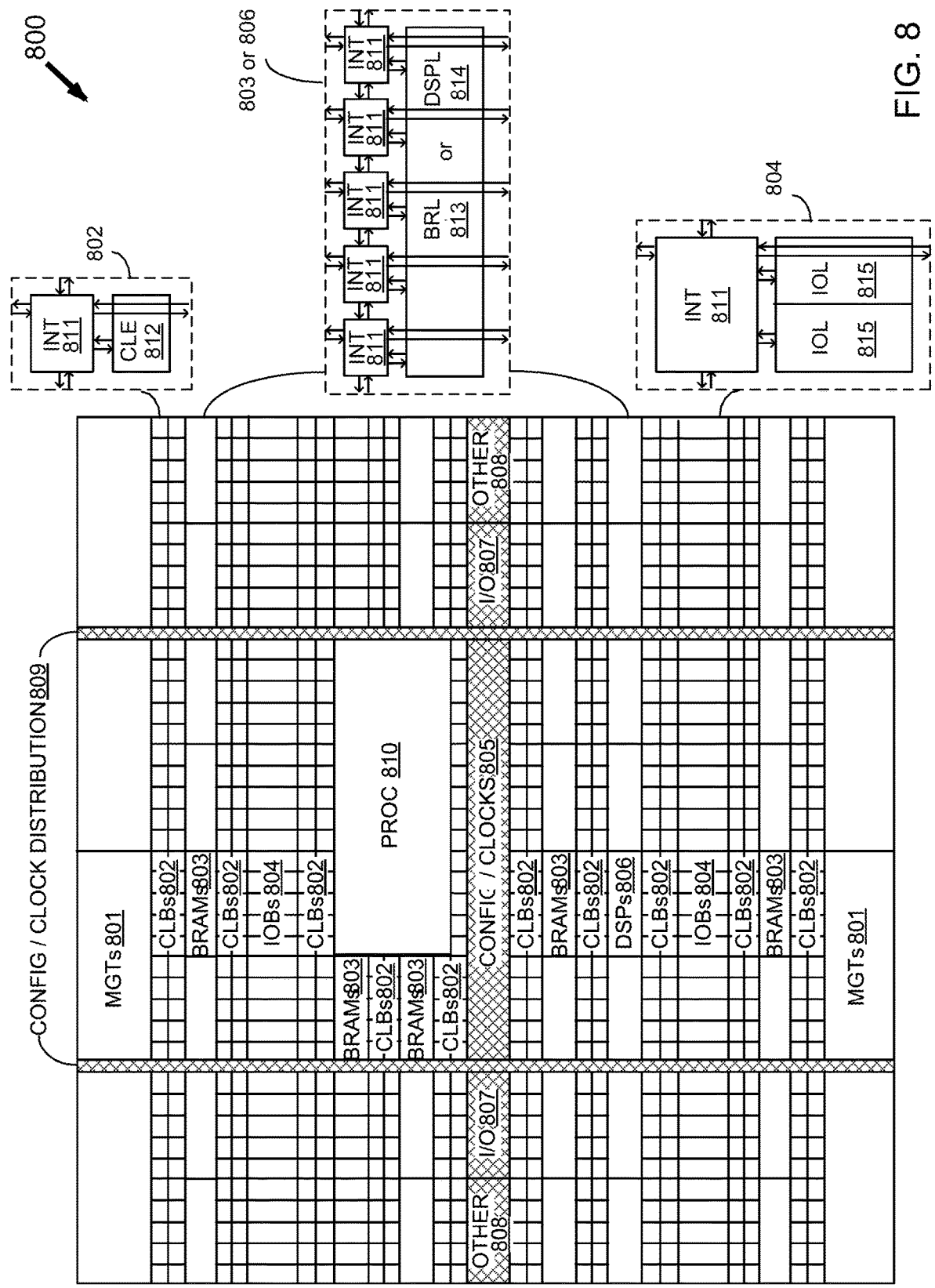
FIG. 8 is a simplified block diagram depicting an exemplary columnar Field Programmable Gate Array ("FPGA") architecture.

As noted above, advanced FPGAs can include several different types of programmable logic blocks in the array. For example, FIG. 8 illustrates an FPGA architecture 800 that includes a large number of different programmable tiles including multi-gigabit transceivers ("MGTs") 801, configurable logic blocks ("CLBs") 802, random access memory blocks ("BRAMs") 803, input/output blocks ("IOBs") 804, configuration and clocking logic ("CONFIG/CLOCKS") 805, digital signal processing blocks ("DSPs") 806, specialized input/output blocks ("I/O") 807 (e.g., configuration ports and clock ports), and other programmable logic 808 such as digital clock managers, analog-to-digital converters, system monitoring logic, and so forth. Some FPGAs also include dedicated processor blocks ("PROC") 810.

In some FPGAs, each programmable tile includes a programmable interconnect element ("INT") 811 having standardized connections to and from a corresponding interconnect element in each adjacent tile. Therefore, the programmable interconnect elements taken together implement the programmable interconnect structure for the illustrated FPGA. The programmable interconnect element 811 also includes the connections to and from the programmable logic element within the same tile, as shown by the examples included at the top of FIG. 8.

For example, a CLB 802 can include a configurable logic element ("CLE") 812 that can be programmed to implement user logic plus a single programmable interconnect element ("INT") 811. A BRAM 803 can include a BRAM logic element ("BRL") 813 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 806 can include a DSP logic element ("DSPL") 814 in addition to an appropriate number of programmable interconnect elements. An IOB 804 can include, for example, two instances of an input/output logic element ("IOL") 815 in addition to one instance of the programmable interconnect element 811. As will be clear to those of skill in the art, the actual I/O pads connected, for example, to the I/O logic element 815 typically are not confined to the area of the input/output logic element 815.

In the pictured embodiment, a horizontal area near the center of the die (shown in FIG. 8) is used for configuration, clock, and other control logic. Vertical columns 809 extending from this horizontal area or column are used to distribute the clocks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic. For example, processor block 810 spans several columns of CLBs and BRAMs.

Note that FIG. 8 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 8 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

One or more of the examples described herein may be implemented in a computer aided design ("CAD") program recorded in a non-transitory machine-readable recording medium which, when executed by a programmed computer or other data processing device, provides a physical synthesis engine configured to perform operations of a program product hereof. Accordingly, a detailed description of a computer system is provided. However, it should be understood that other types of data processing devices and/or systems may benefit from the technology described herein.

Figure 9:
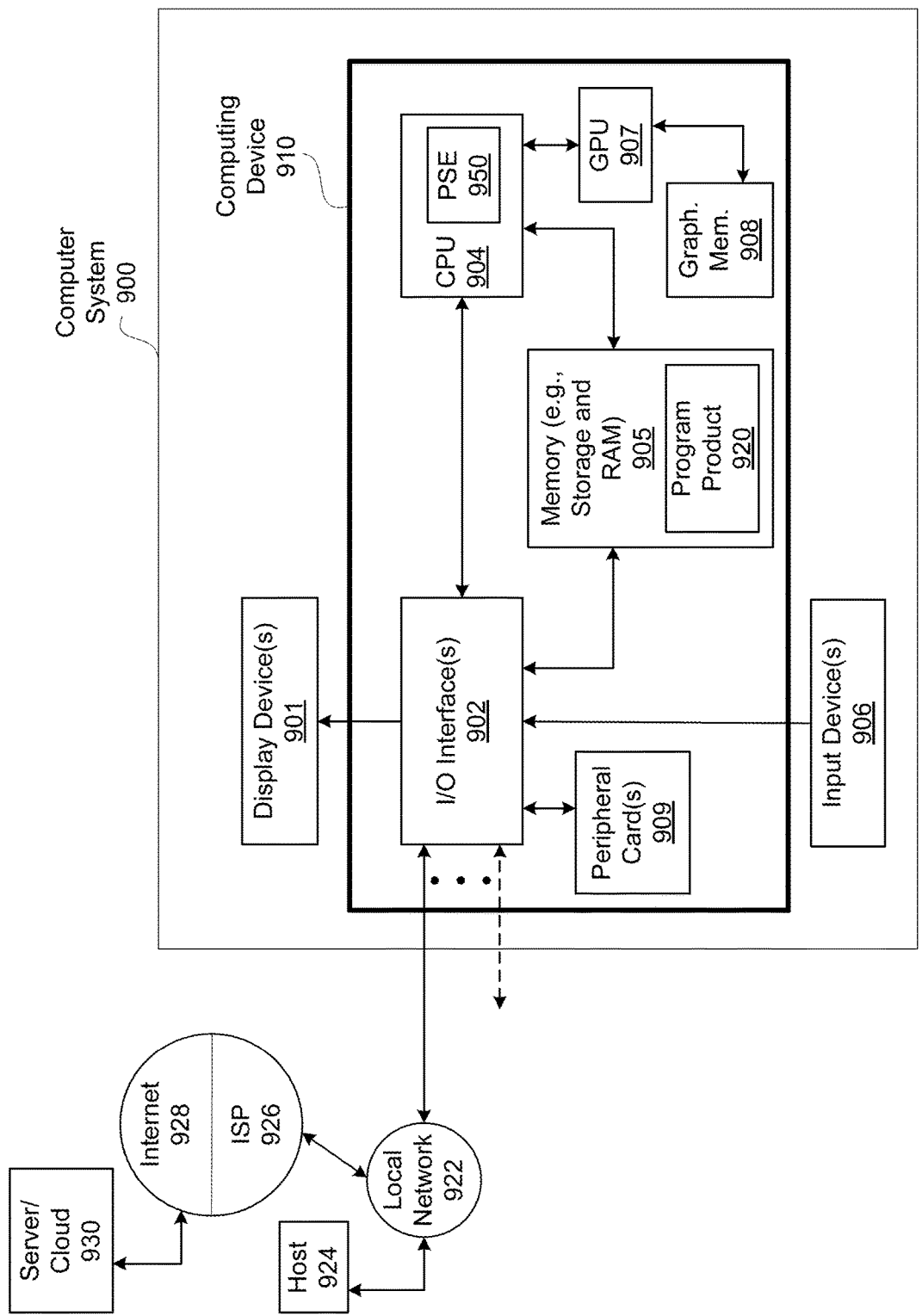
FIG. 9 is a block diagram depicting an exemplary computer system.

FIG. 9 is a block diagram depicting an exemplary computer system 900 upon which one or more aspects described herein may be implemented. Computer system 900 may include a programmed computing device 910 coupled to one or more display devices 901, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 906, such as a keyboard and a cursor pointing device. Other known configurations of a computer system may be used. Computer system 900 by itself or networked with one or more other computer systems 900 may provide an information handling system.

Programmed computing device 910, which may be considered a system itself, may be programmed with a suitable operating system, which may include Mac OS, Java Virtual Machine, Real-Time OS Linux, Solaris, iOS, Darwin, Android Linux-based OS, Linux, OS-X, Unix, or a Windows operating system, among other platforms, including without limitation an embedded operating system, such as VxWorks. Programmed computing device 910 includes a central processing unit ("CPU") 904, one or more memories and/or storage devices ("memory") 905, and one or more input/output ("I/O") interfaces ("I/O interface") 902. Programmed computing device 910 may optionally include a graphics processing unit ("GPU") 907 coupled to CPU 904 and one or more peripheral cards 909 coupled to I/O interface 902. Along those lines, programmed computing device 910 may include graphics memory 908 coupled to optional GPU 907.

CPU 904 may be a type of microprocessor known in the art, such as available from IBM, Intel, ARM, and Advanced Micro Devices for example. CPU 904 may include one or more processing cores. Support circuits (not shown) may include busses, cache, power supplies, clock circuits, data registers, and the like.

Memory 905 may be directly coupled to CPU 904 or coupled through I/O interface 902. At least a portion of an operating system may be disposed in memory 905. Memory 905 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 905 may include an SSD, which is coupled to I/O interface 902, such as through an SATA bus or other bus. Moreover, one or more SSDs may be used, such as for RAID or other multiple drive storage for example.

I/O interface 902 may include chip set chips, graphics processors, and/or daughter cards, among other known circuits. In this example, I/O interface 902 may be a Platform Controller Hub ("PCH"). I/O interface 902 may be coupled to a conventional keyboard, network, mouse, camera, microphone, display printer, and interface circuitry adapted to receive and transmit data, such as data files and the like.

Programmed computing device 910 may optionally include one or more peripheral cards 909. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 904 and I/O interface 902. Along those lines, GPU 907 may be incorporated into CPU 904 and/or may be of a separate peripheral card.

Programmed computing device 910 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 910. However, for purposes of clarity and not limitation, it shall be assumed that an SSD is housed in programmed computing device 910.

Memory 905 may store all or portions of one or more programs ("program code") and/or data, including variables or intermediate information during execution of instructions by CPU 904, to implement or initiate operations for processes in accordance with one or more examples hereof to provide program product 920. Program product 920 may be for implementing of process flows or portions thereof, as described herein, using program code in accordance with such process flows or portions thereof. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 910 for implementing techniques described herein may be performed by computing device 910 in response to CPU 904 executing one or more sequences of one or more instructions contained in main memory of memory 905 to provide a physical synthesis engine ("PSE") 950. Such instructions may be read into such main memory from another machine-readable medium, such as a storage device of memory 905. Execution of the sequences of instructions contained in main memory may cause CPU 904 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product, including without limitation program code 920, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 920. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 900, tangible machine-readable media may be involved, for example, in providing instructions to CPU 904 for execution as part of program product 920 programmed or loaded into memory. Thus, a programmed computing device 910 may include programmed or loaded program product 920 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 904 for execution. For example, instructions may initially be carried on a magnetic disk or other storage media of a remote computer. The remote computer can load the instructions into its dynamic memory and send such instructions over a transmission media using a modem. A modem local to computer system 900 can receive such instructions on such transmission media and use an infra-red transmitter to convert such instructions to an infra-red signal. An infra-red detector can receive such instructions carried in such infra-red signal and appropriate circuitry can place such instructions on a bus of computing device 910 for writing into main memory, from which CPU 904 can retrieve and execute such instructions. Instructions received by main memory may optionally be stored on a storage device either before or after execution by CPU 904.

Computer system 900 may include a communication interface as part of I/O interface 902 coupled to a bus of computing device 910. Such a communication interface may provide a two-way data communication coupling to a network link connected to a local network 922. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 922 may provide data communication through one or more networks to other data devices. For example, a network link may provide a connection through local network 922 to a host computer 924 or to data equipment operated by an Internet Service Provider ("ISP") 926 or other Internet service provider. ISP 926 may in turn provide data communication services through a world-wide packet data communication network, the "Internet" 928. Local network 922 and the Internet 928 may both use electrical, electromagnetic or optical signals that carry analog and/or digital data streams. Data carrying signals through various networks, which carry data to and from computer system 900, are exemplary forms of carrier waves for transporting information.

Wireless circuitry of I/O interface 902 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000, EV-DO, and LTE/LTE-Advanced) can be used depending on the type of communication or the range of the communication.

Computer system 900 can send messages and receive data, including program code, through network(s) via a network link and communication interface of I/O interface 902. In the Internet example, a server 930 might transmit a requested code for an application program through Internet 928, ISP 926, local network 922 and I/O interface 902. Received code may be executed by processor 904 as it is received, and/or stored in a storage device, or other non-volatile storage, of memory 905 for later execution. In this manner, computer system 900 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for generating a physical design for a circuit design, comprising:
    obtaining a logical network from a logical netlist for the circuit design;
    obtaining a physical network for an integrated circuit chip;
    converting the physical network into a routing graph;
    combining the logical network and the routing graph to build an extended network; and
    routing on the extended network for the logical netlist to perform placement and the routing concurrently to provide the physical design.

2. The method according to claim 1, wherein:
    the converting comprises building the routing graph for the physical network having physical nodes; and
    the combining comprises:
        adding logical nodes of the logical network to the routing graph; and
        interconnecting the logical nodes to the physical nodes.

3. The method according to claim 2, wherein the interconnecting comprises:
    interconnecting a first set of all combinations of interconnections of input nodes of the logical nodes to input nodes of the physical nodes;
    the physical nodes representing wires of the physical network; and
    interconnecting a second set of all combinations of interconnections of output nodes of the logical nodes to output nodes of the physical nodes.

4. The method according to claim 2, wherein the interconnecting comprises:
   interconnecting a first subset of combinations of interconnections of input nodes of the logical nodes to input nodes of the physical nodes;
   the physical nodes representing wires of the physical network; and
   interconnecting a second subset of combinations of interconnections of output nodes of the logical nodes to output nodes of the physical nodes.

5. The method according to claim 2, wherein the interconnecting comprises for a source node of the logical nodes, adding an outgoing edge from the source node to at least one driver node of the physical nodes.

6. The method according to claim 5, wherein the interconnecting comprises for a sink node of the logical nodes, adding an incoming edge to the sink node from at least one load node of the physical nodes.

7. The method according to claim 2, wherein:
   the interconnecting comprises:
      for each source node of the logical nodes, adding an outgoing edge from the source node to each driver node of the physical nodes in the routing graph; and
      for each sink node of the logical nodes, adding an incoming edge to the sink node from each load node of the physical nodes in the routing graph; and
   the routing comprises:
      determining valid routings for instantiation of the logical netlist in the extended network;
      filtering out invalid placements from the valid routings; and
      selecting a valid routing from the valid routings remaining after the filtering thereof.

8. The method according to claim 7, wherein the filtering has a constraint of each circuit instance of the logical network must be mapped to a unique circuit instance in the physical network.

9. The method according to claim 8, wherein the constraint is a first constraint, and wherein the filtering has a second constraint of limiting connection of each of the logical nodes to only one of the physical nodes.

10. The method according to claim 8, wherein subsets of outgoing edges and incoming edges added for the interconnecting are culled for the determining of the valid routings.

11. A system, comprising:
    a memory configured to store program code; and
    a processor coupled to the memory, wherein the processor, in response to executing the program code, is configured to initiate operations for generating a physical design for a circuit design, including:
       obtaining a logical network from a logical netlist for the circuit design;
       obtaining a physical network for an integrated circuit chip;
       converting the physical network into a routing graph including representing wires of the physical network as physical nodes in the routing graph;
       combining the logical network and the routing graph to build an extended network; and
       routing on the extended network for the logical netlist to perform placement and the routing concurrently to provide the physical design.

12. The system according to claim 11, wherein the processor, in response to executing the program code, is configured to initiate operations for implementing performing of the combining, including:
    adding logical nodes of the logical network to the routing graph; and
    interconnecting the logical nodes to the physical nodes.

13. The system according to claim 12, wherein the processor, in response to executing the program code, is configured to initiate operations for implementing performing of the interconnecting, including:
    interconnecting a first set of all combinations of interconnections of input nodes of the logical nodes to input nodes of the physical nodes; and
    interconnecting a second set of all combinations of interconnections of output nodes of the logical nodes to output nodes of the physical nodes.

14. The system according to claim 12, wherein the processor, in response to executing the program code, is configured to initiate operations for implementing performing of the interconnecting, including:
    interconnecting a first subset of combinations of interconnections of input nodes of the logical nodes to input nodes of the physical nodes; and
    interconnecting a second subset of combinations of interconnections of output nodes of the logical nodes to output nodes of the physical nodes.

15. The system according to claim 12, wherein the processor, in response to executing the program code, is configured to initiate operations for implementing performing of the interconnecting, including, for a source node of the logical nodes, adding an outgoing edge from the source node to at least one driver node of the physical nodes.

16. The system according to claim 15, wherein the processor, in response to executing the program code, is configured to initiate operations for implementing performing of the interconnecting, including, for a sink node of the logical nodes, adding an incoming edge to the sink node from at least one load node of the physical nodes.

17. The system according to claim 12, wherein:
    the processor, in response to executing the program code, is configured to initiate operations for implementing performing of the interconnecting, including:
       for each source node of the logical nodes, adding an outgoing edge from the source node to each driver node of the physical nodes in the routing graph; and
       for each sink node of the logical nodes, adding an incoming edge to the sink node from each load node of the physical nodes in the routing graph; and
    the processor, in response to executing the program code, is configured to initiate operations for implementing performing of the routing, including:
       determining valid routings for instantiation of the logical netlist in the extended network;
       filtering out invalid placements from the valid routings; and
       selecting a valid routing from the valid routings remaining after the filtering thereof.

18. The system according to claim 17, wherein the filtering has a constraint of each circuit instance of the logical network must be mapped to a unique circuit instance in the physical network.

19. The system according to claim 18, wherein the constraint is a first constraint, and wherein the filtering has a second constraint of limiting connection of each of the logical nodes to only one of the physical nodes.

20. The system according to claim 18, wherein subsets of outgoing edges and incoming edges added for the interconnecting are culled for the determining of the valid routings.

* * * * *